Feb. 12, 1924.
H. L. TIGER
HYDROMETER
Filed June 2, 1923
1,483,493
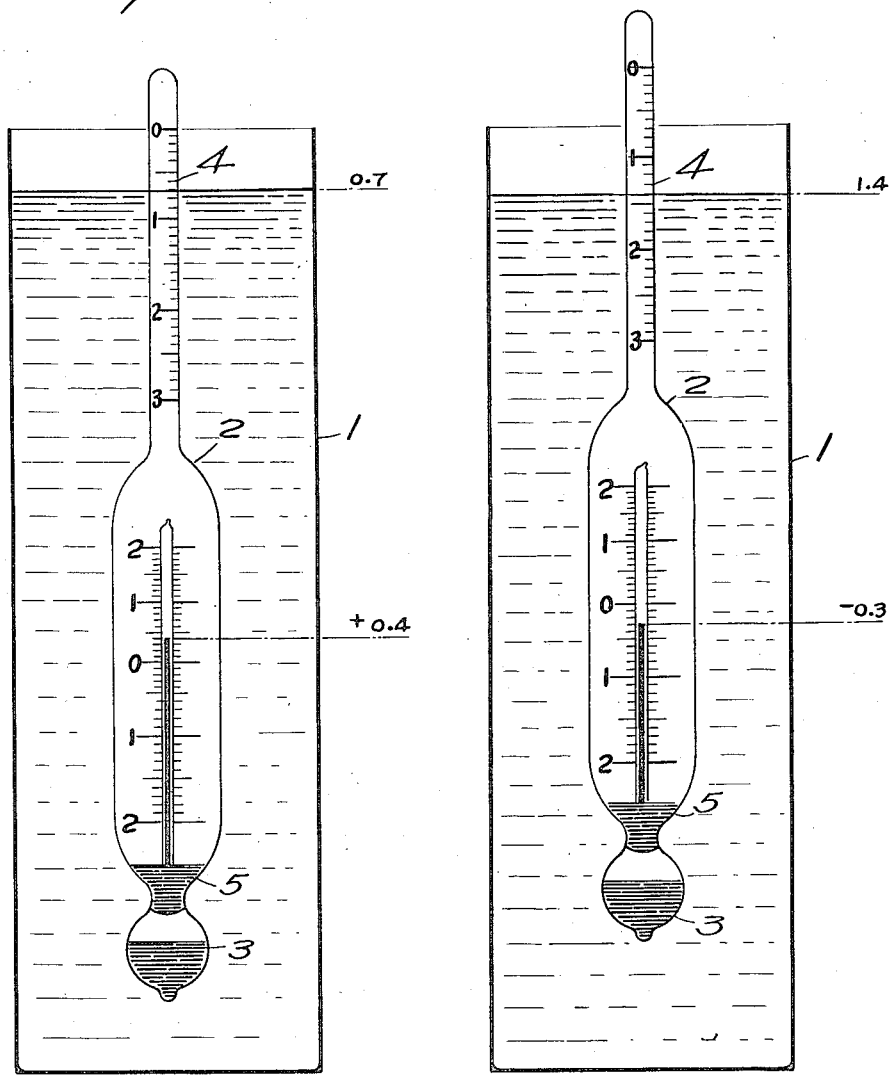
Inventor
HOWARD L. TIGER,
By W. P. McElroy
Attorney Patented Feb. 12, 1924.

1,483,493

UNITED STATES PATENT OFFICE.

HOWARD L. TIGER, OF NEW YORK, N. Y., ASSIGNOR TO THE PERMUTIT COMPANY, OF NEW YORK, N. Y., A CORPORATION OF DELAWARE.

HYDROMETER.

Application filed June 2, 1923. Serial No. 642,980.

*To all whom it may concern:*

Be it known that I, HOWARD L. TIGER, a citizen of the United States, residing at New York, in the county of New York and State of New York, have invented certain new and useful Improvements in Hydrometers, of which the following is a specification.

This invention relates to hydrometers; and it comprises a particular hydrometer for determining the saline concentration of hot blow-off water, such hydrometer being graduated in degrees of a density scale and advantageously in Baumé degrees and reading 0° in pure water at or about 180° F. and carrying a thermometric device calibrated to give corrections for temperatures above and below 180° F.; all as more fully hereinafter set forth and as claimed.

In the use of a steam boiler, as water is evaporated and converted into steam, the salts present in the original water and in that added as feed water, are left behind and the saline concentration in the boiler increases. For each particular boiler, under a given set of conditions, there is a limit beyond which it is not safe to concentrate these salts because of the attendant dangers of priming and foaming resulting in wet steam. It is therefore customary to blow off a portion of the boiler water at regular intervals and to replace this saline blow-off with fresh make-up water, thereby reducing the average concentration of solids in the boiler water. Where there is no means of measuring the density of the boiler blow-off water, that is, the concentration of dissolved salts in the water, the boiler operator has no way of telling whether he is blowing off enough for safe operation or too much for economical operation.

There exists a definite relation between density and the quantity of salts in solution. For example, a solution containing 1 per cent of sodium chlorid has a density of 1° Baumé at 60° F. This relation varies somewhat for various salts. However, for any particular set of operating conditions in a given boiler plant, the maximum allowable saline concentration is fixed on the scale of density, and it is therefore unnecessary to identify the salts present, in view of the fact that the ratio of one constituent to another does not vary appreciably in any particular boiler feed water. It follows that for satisfactory blow-off control of a boiler under a given set of conditions, it is only necessary to determine the maximum permissible density in the boiler saline, and then to blow off sufficiently to maintain a density below this maximum figure.

It is therefore of considerable importance to provide a quick and simple method of determining the saline concentration of these hot water solutions. Many methods of determining saline concentrations therein are known and some are in use; but without exception they require considerable time or expert skill or, usually, both. These methods embody various principles. The chlorids may be determined by titration; the total solids may be determined by evaporation and drying; the conductivity may be determined by galvanometric measurement, and so on. Or the water may be allowed to cool to a definite temperature and the density taken by a hydrometer, by sinking and swimming bulbs. In the method of taking the saline content of hot boiler water by cooling to a definite temperature and then using a hydrometer, the time and manipulation required are serious drawbacks, although the process gives results of sufficient accuracy.

In most boilers, the allowable concentration rarely exceeds 1.5 per cent of salts, which is equivalent to a density or specific gravity of about 1.5° Baumé. Since the density of water, or of a saline solution increases about 5° Baumé on cooling from 212° F. (the temperature of water as it comes from the boiler) to 60° F. (the temperature at which usual hydrometer measurements are made), it is obvious that a correction must be made on the density reading if it be taken at high temperatures, to avoid the long and tedious operation of cooling. Frequently also, it is impossible to cool blow-off water to 60° F. in a hot boiler room, except by artificial means, and workmen are prone to take such density readings with the ordinary types of hydrometer at temperatures above 60°, with the result of incorrect readings.

It is apparent from the foregoing that frequent determination of the saline content of hot blow-off water is desirable though not now practicable. It is the object of the present invention to give practicable means suitable for use in the usual boiler room. Water from gage glasses and the like is usually not truly representative of the saline content of the water in the boiler and particularly in its lower portions. The most satisfactory method of boiler water sampling is to put a valved connection on the blow-off line so that a bucket or other convenient quantity of the water can be collected from time to time by opening the valve.

Experience has shown that during the short interval of time which elapses between the drawing of the sample and the reading of density, the temperature of the blow-off water ordinarily drops from 212° F., which is the temperature when it reaches the atmosphere, to about 180° F. It is for this reason that the instrument herein described has been designed with a zero correction usually made equivalent to 180° F.

In the present invention, a hydrometer is graduated in Baumé (or other densimetric) degrees in such a way as to read 0° in pure water at 180° F. The graduation may cover three or four Baumé degrees. A graduation of three degrees in tenths or fifths is suitable. This hydrometer may be of any of the usual types, and may be weighted with shot or mercury, as may be most convenient. The hydrometer itself is usually made of glass. It carries a thermometric device which, however, is not graduated on any of the usual thermometric scales, but is graduated to give Baumé, or other densimetric, corrections for temperatures somewhat above and somewhat below 180° F.

If the density reading is taken at a temperature above 180° F., the correction indicated on the correction scale is added to the stem reading on the hydrometer. If the density reading is taken at a temperature below 180°, the density correction indicated on the correction scale is subtracted from the stem reading on the hydrometer. If the density reading is taken at 180°, no correction is necessary. Thus the hydrometer stem reading and the necessary correction reading are all taken on the single instrument, and it therefore gives a simple and rapid method for determining the true density of the saline solution. Assume, for example, a saline having an actual density of 1.1° Baumé with a standard hydrometer at 60° F. This would have the same reading, i. e., 1.1° Baumé and zero correction at 180° F. when observed on the hydrometer described herein. At a temperature of 188° F., however, the stem reading would be 0.7° Baumé and the correction would be +0.4, again making a final corrected reading of 1.1°. At a temperature of 174° F., the reading would be 1.4° Baumé with a minus correction 0.3, still giving the final corrected reading of 1.1°.

In the accompanying illustrations I have shown a hydrometer under the present invention, the showing being partly in central vertical section and partly in elevation.

In this showing both Figures 1 and 2 represent the hydrometer, Fig. 1 representing it as used with a particular water warmer than 180° F. and Fig. 2 with a water colder than 180° F.

In the illustration, in Fig. 1 the device is shown as used in water at temperatures above 180° F. in which case the correction on the thermometric device is plus. The particular temperature chosen is 188° F. In Fig. 2, the device is shown in water at a temperature below 180° F., in which event the correction is minus. The temperature used is assumed to be 174° F. In both cases, the water used for illustration has a real density of 1.1° Baumé and would show this density on the stem at 180° F.

In both figures, element 1 is a hydrometer jar, usually of glass. 2 indicates the new hydrometer as a whole. As shown, it is of glass and is mercury weighted at 3. It is provided with a stem 4 graduated in Baumé degrees; the graduation usually being between 0° and 3° Baumé. Carried by the hydrometer is a thermometric device 5 with a Baumé correcting scale. At 180° F., the scale reads 0.0 correction. At higher temperatures there is a plus correction (as shown in Fig. 1) and at lower temperatures (as shown in Fig. 2) a minus correction.

In reading the instrument as shown in Fig. 1, the value +0.4 indicated on the thermometric device is simply added to the Baumé reading 0.7 to get the true Baumé value of the water, namely, 1.1° in this case. Similarly, in reading the instrument shown in Fig. 2, the value shown on the thermometric device —0.3 is simply deducted from the stem reading of 1.4 to get the true Baumé value of 1.1°.

What I claim is:—

1. A temperature correcting hydrometer for determining the density of hot boiler salines, such hydrometer having a stem graduated in density degrees for a particular temperature and carrying a thermometric device graduated in temperature corrections in terms of density to be applied to the density indicated on said stem.

2. A temperature correcting Baumé hydrometer for determining the saline content of hot boiler waters, such hydrometer being graduated to read in Baumé degrees with the 0° point at about 180° F. and carrying a thermometric device indicating Baumé corrections above and below 180° F.

In testimony whereof, I have hereunto affixed my signature.

HOWARD L. TIGER.